United States Patent
Bichsel

(10) Patent No.: US 8,393,368 B2
(45) Date of Patent: Mar. 12, 2013

(54) NUMERICALLY CONTROLLED COMPOSITE COMPACTION DEVICE

(75) Inventor: Steve L. Bichsel, Arlington, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 132 days.

(21) Appl. No.: 12/475,923

(22) Filed: Jun. 1, 2009

(65) Prior Publication Data

US 2010/0300600 A1 Dec. 2, 2010

(51) Int. Cl.
*B32B 41/00* (2006.01)

(52) U.S. Cl. ........ 156/358; 156/359; 156/378; 156/379; 156/361; 156/583.1

(58) Field of Classification Search ............... 156/358, 156/359, 378, 379, 361, 555, 583.1
See application file for complete search history.

(56) References Cited

U.S. PATENT DOCUMENTS

| | | | |
|---|---|---|---|
| 3,638,464 A | 2/1972 | Winter et al. | |
| 3,727,443 A | 4/1973 | Quinlan | |
| 3,827,270 A | 8/1974 | Neilsen | |
| 3,857,750 A | 12/1974 | Winter et al. | |
| 3,934,443 A | 1/1976 | Keen | |
| 4,974,434 A | 12/1990 | Reccius et al. | |
| 5,244,531 A * | 9/1993 | Wells | 156/555 |
| 5,258,961 A * | 11/1993 | Sehr et al. | 367/96 |
| 6,131,430 A | 10/2000 | Schneider et al. | |
| 6,755,065 B2 | 6/2004 | Ostertag | |
| 7,096,570 B2 | 8/2006 | Marr et al. | |
| 7,472,736 B2 | 1/2009 | Kisch et al. | |
| 2004/0060650 A1* | 4/2004 | Holmes et al. | 156/272.2 |
| 2006/0073309 A1* | 4/2006 | Hogg | 428/156 |
| 2006/0278324 A1* | 12/2006 | Sasaki | 156/64 |
| 2007/0006658 A1* | 1/2007 | Kennedy et al. | 73/622 |
| 2007/0150147 A1 | 6/2007 | Rasmussen et al. | |
| 2008/0000576 A1* | 1/2008 | Miller et al. | 156/166 |
| 2008/0047651 A1* | 2/2008 | Park | 156/60 |

OTHER PUBLICATIONS

Munki Lee, Heat Transfer and Consolidation Modeling of Composite Fiber tow in Fiber Placement, Dissertation from Virginia Polytechnic Institute, Mar. 19, 2004, pp. 64-69.*

* cited by examiner

*Primary Examiner* — George Koch

(74) *Attorney, Agent, or Firm* — Bracewell & Giuliani LLP

(57) ABSTRACT

A method of manufacturing a composite structure by compacting layers of laminate material within a mold and then curing the layers of laminate material within the mold.

13 Claims, 8 Drawing Sheets

NUMERICALLY CONTROLLED COMPOSITE COMPACTION DEVICE

STATEMENT OF GOVERNMENT INTEREST

This invention was made under U.S. Government Contract N00019-02-C-3002. The Government has certain rights in the invention.

BACKGROUND

This disclosure relates to manufacturing composite structures.

BRIEF DESCRIPTION OF THE DRAWINGS

FIG. 2b is a bottom view of an exemplary embodiment of the compaction device of FIG. 2a.

DETAILED DESCRIPTION

Figure 1:
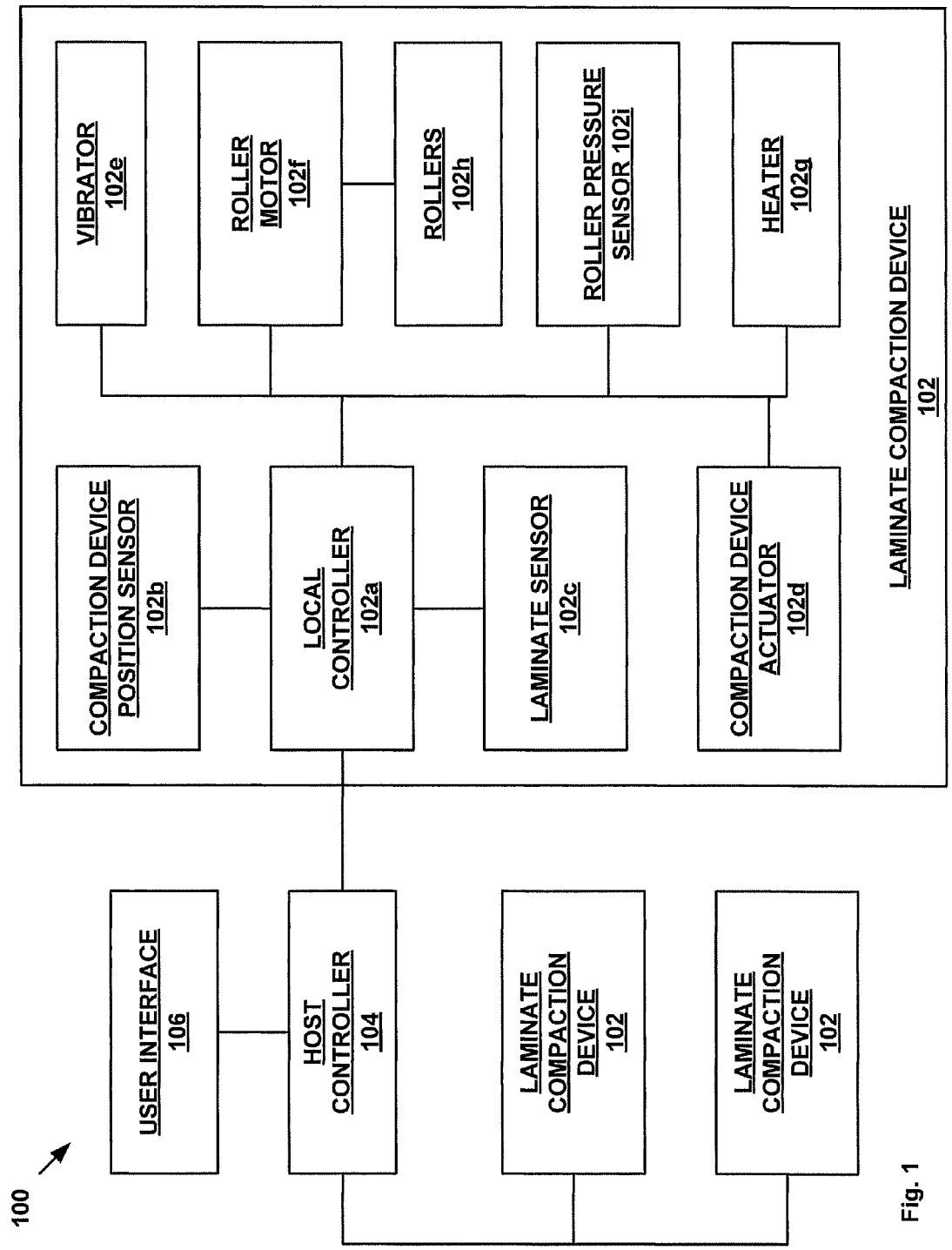
FIG. 1 is a schematic illustration of an exemplary embodiment of system for compacting laminates for use in manufacturing composite panels for an aircraft that includes one or more compaction devices.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Figure 2A:
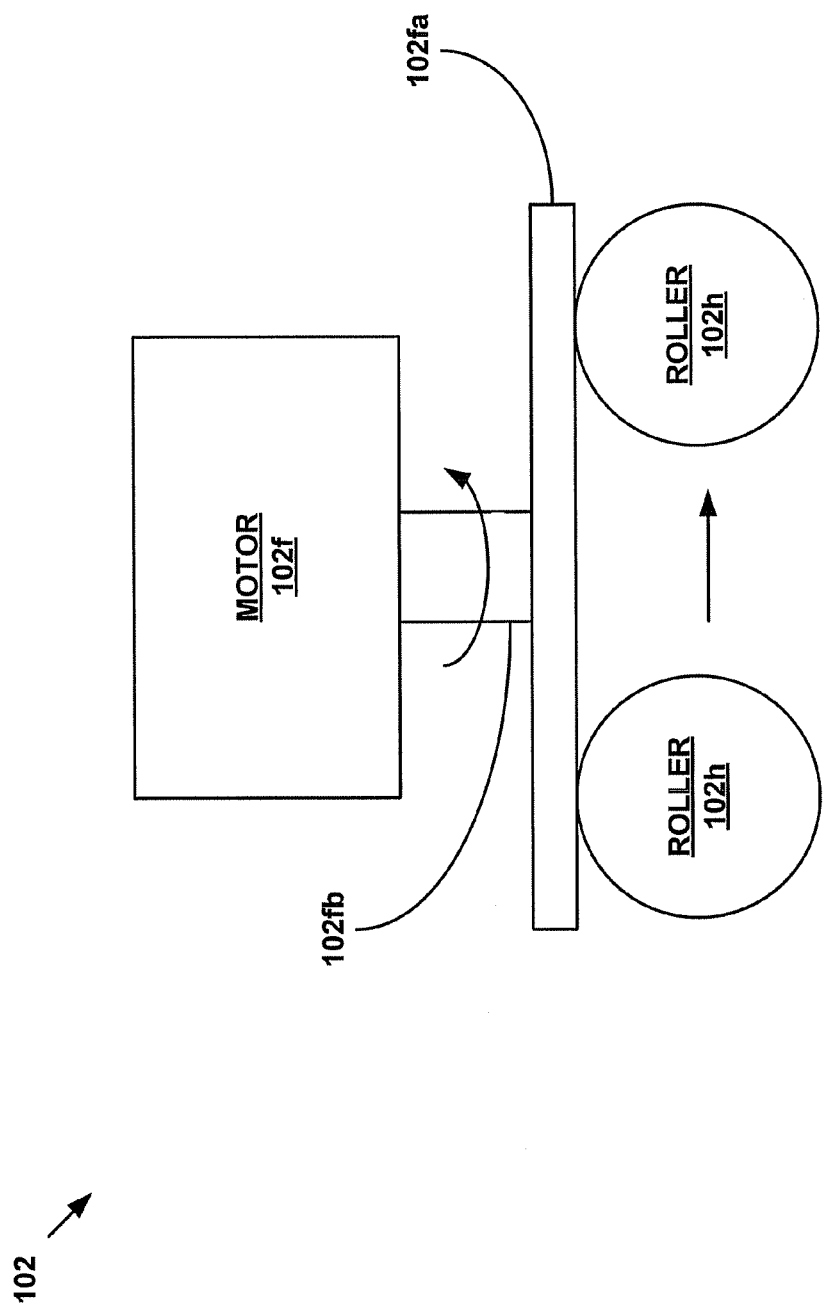
FIG. 2a is a front view of an exemplary embodiment of the compaction device of FIG. 1.
Figure 2B:
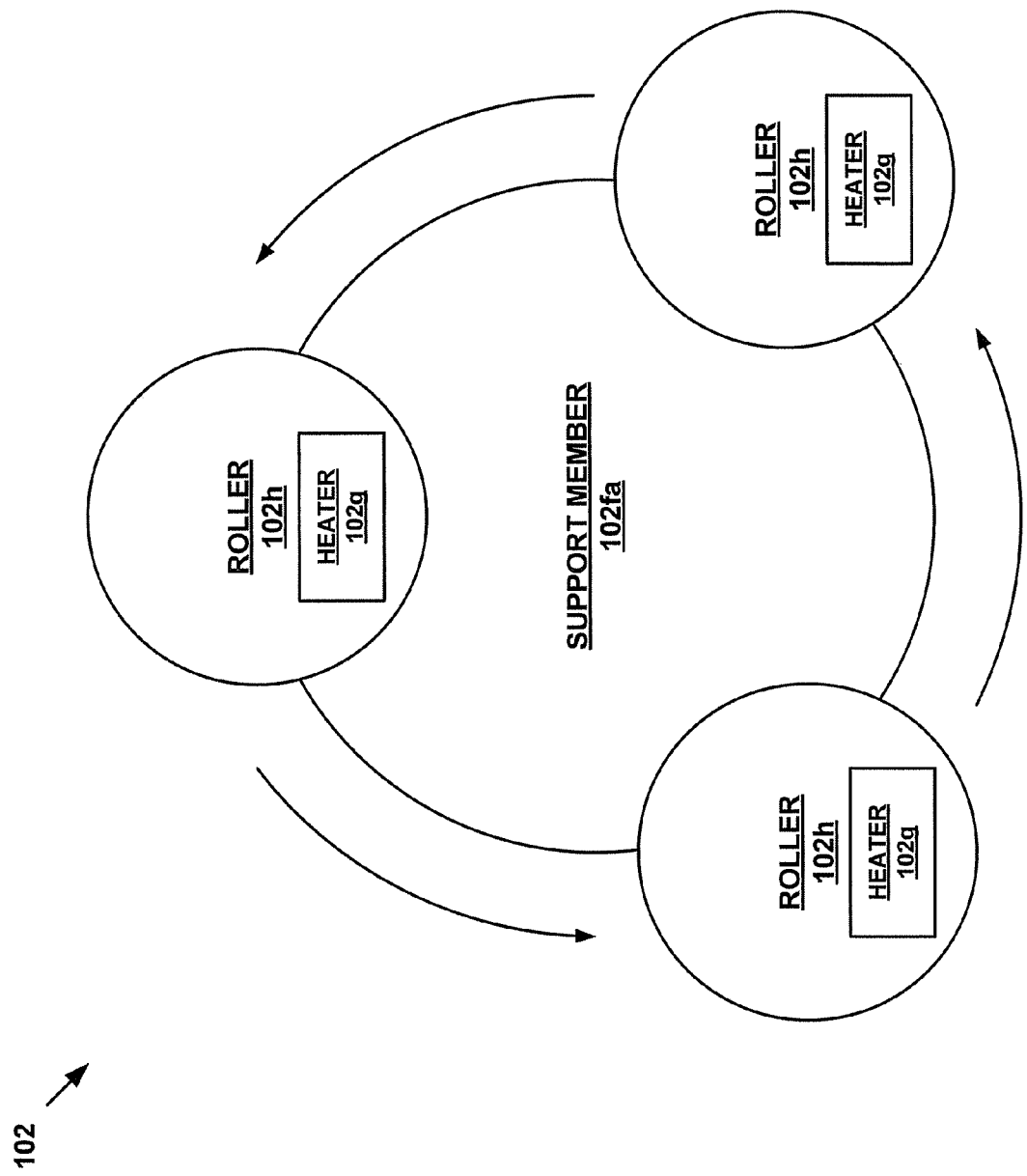
Figure 3A:
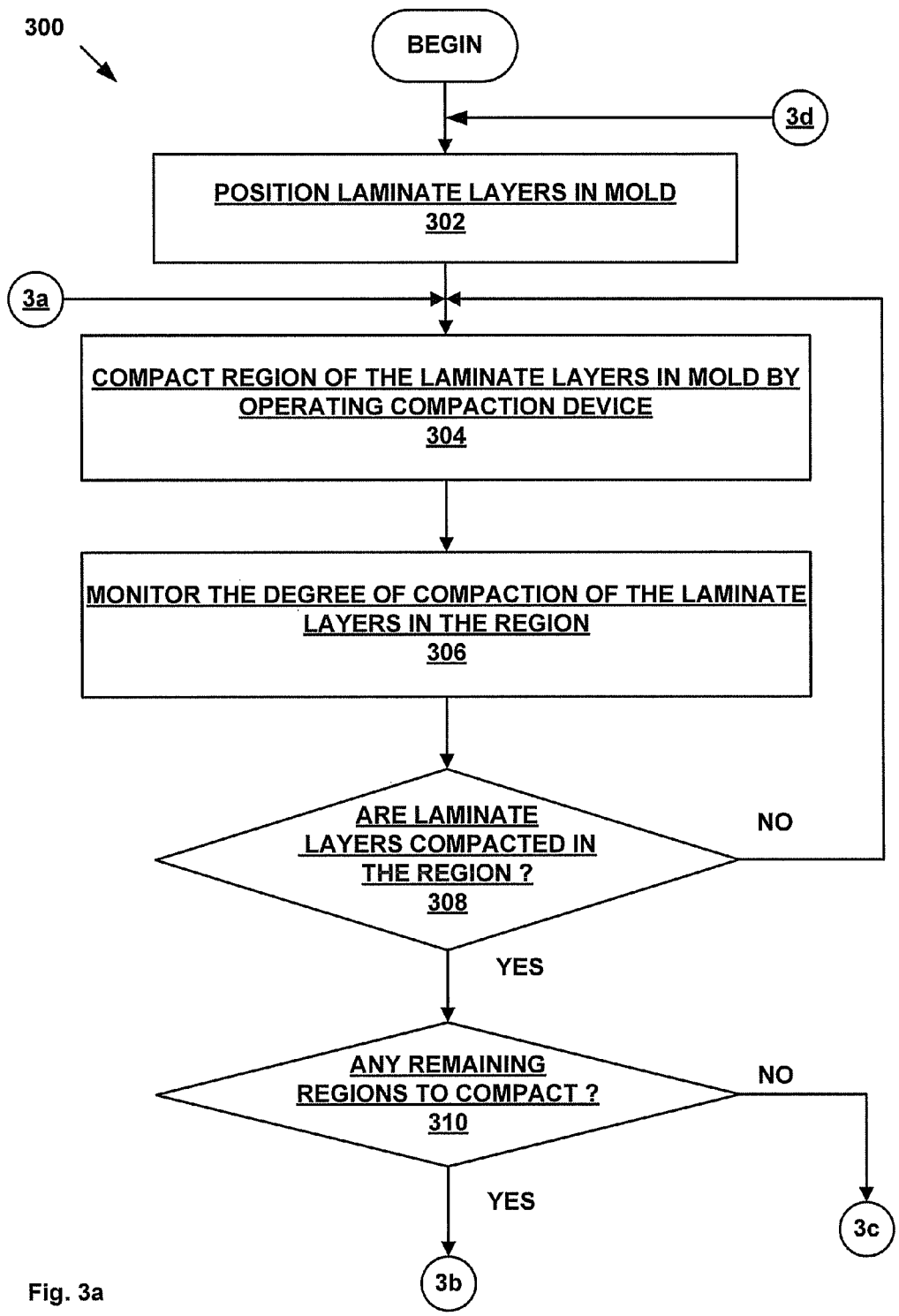
FIGS. 3a-3c are flow chart illustrations of an exemplary embodiment of a method for operating the compaction device of FIG. 1.
Figure 3B:
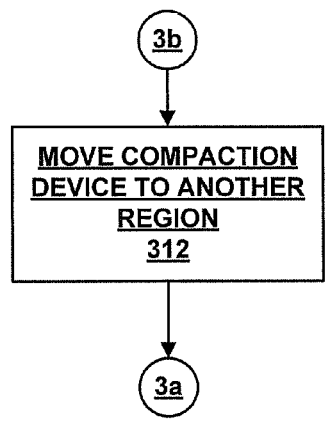
Figure 3C:
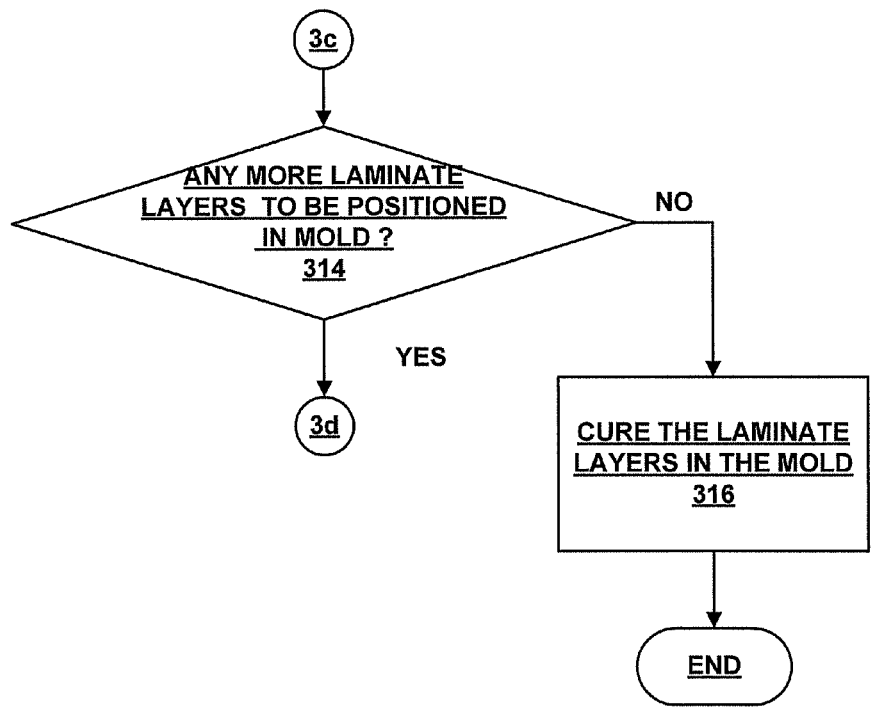
Figure 4:
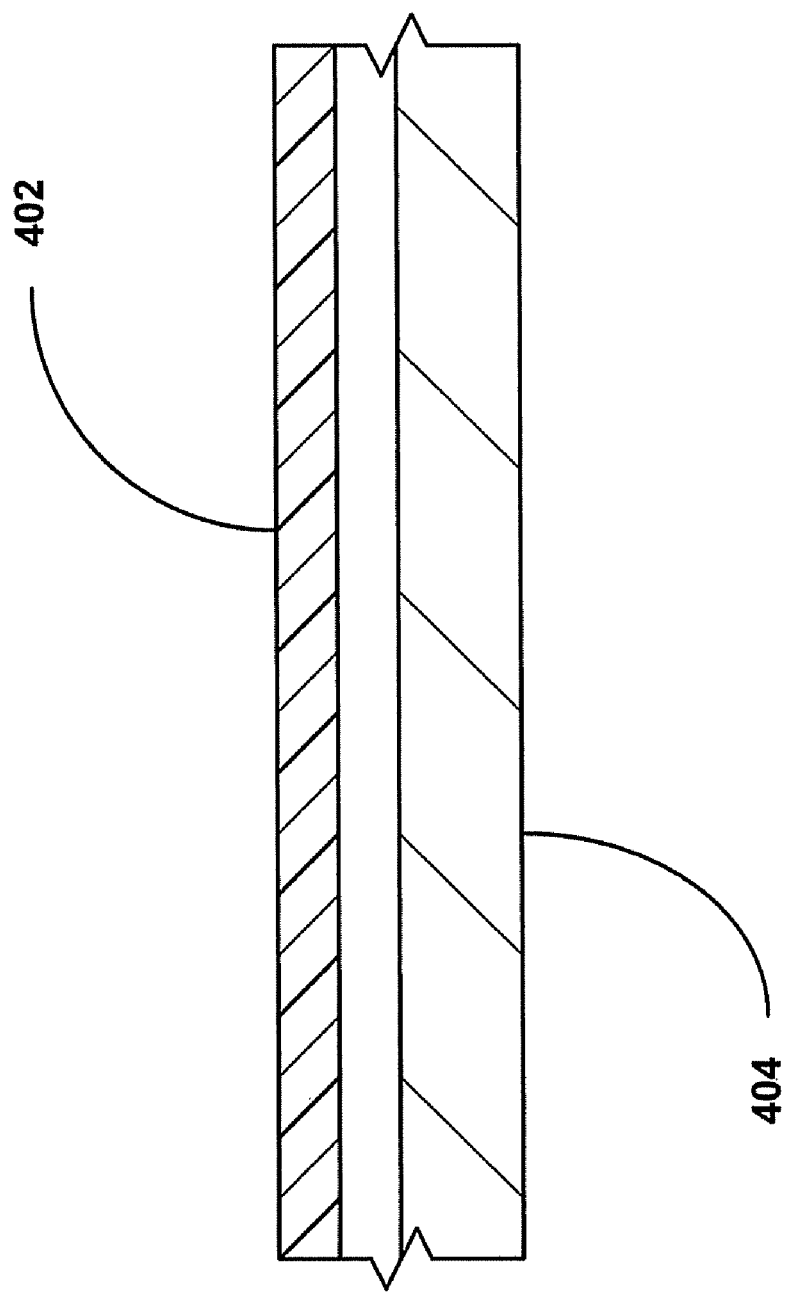
FIG. 4 is a fragmentary cross sectional illustration of the placement of laminate layers within a mold.
Figure 5:
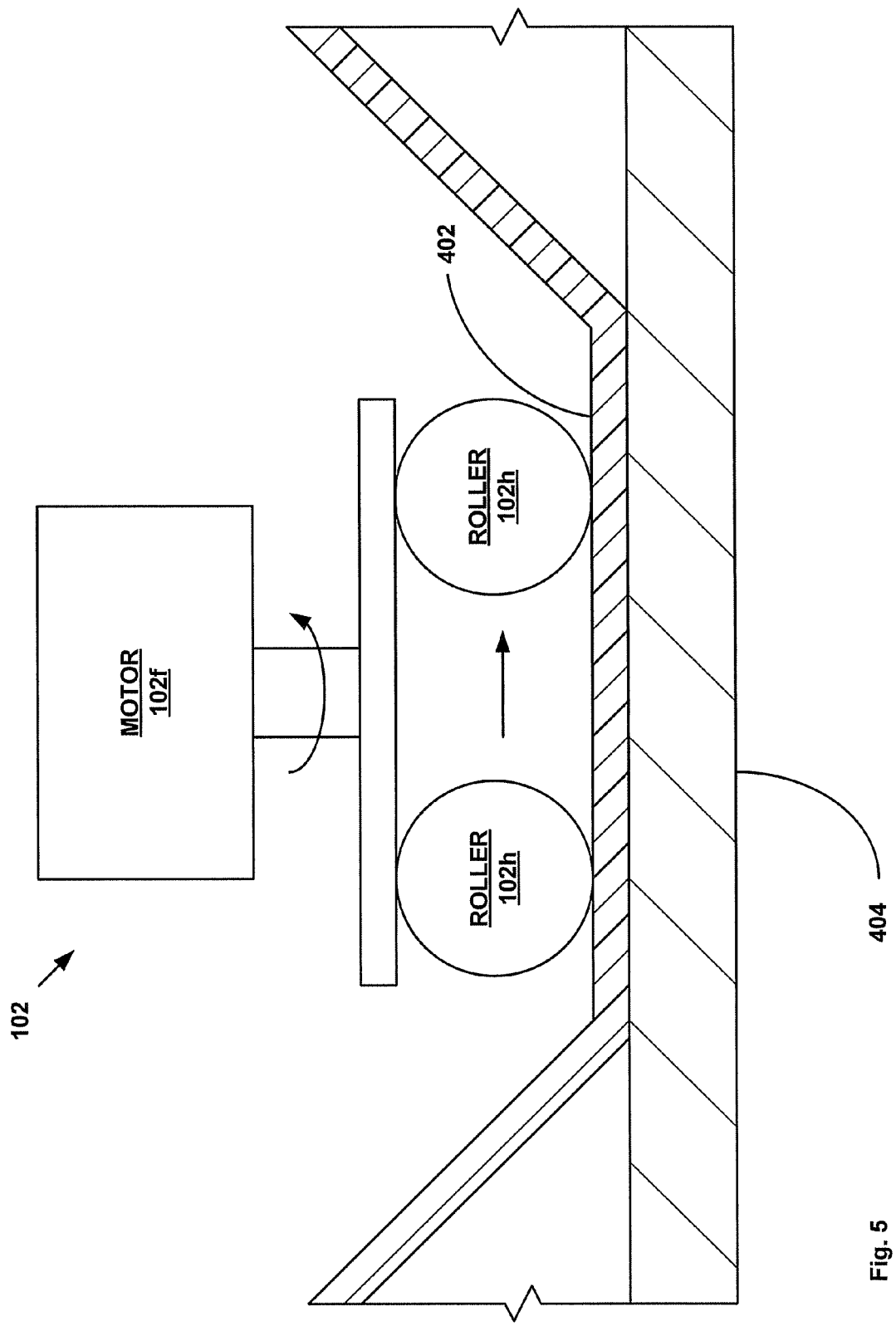
FIG. 5 is a fragmentary cross sectional illustration of the compacting of the laminate layers within the mold of FIG. 4.

Referring initially to FIGS. 1, 2a and 2b, an exemplary embodiment of a system 100 for compacting laminate layers for use in manufacturing composite structures includes one or more laminate compaction devices 102 that are operably coupled to a host controller 104 having a user interface 106. In an exemplary embodiment, each laminate compaction device 102 includes a local controller 102a that is operably coupled to the host controller 104. In an exemplary embodiment, the local controller 102a is also operably coupled to a compaction device position sensor 102b, a laminate sensor 102c, a compaction device actuator 102d, a vibrator 102e, a roller motor 102f, a heater 102g. In an exemplary embodiment, one or more rollers 102h are also operably coupled to the roller motor 102f. In an exemplary embodiment, the laminate compaction device 102 further includes one or more roller pressure sensors 102i for sensing a degree of contact pressure between one or more of the rollers 102h and laminate layers being compacted by the laminate compaction device.

In an exemplary embodiment, the local controller 102a may include a programmable general purpose controller such as, for example, a microprocessor and a non-volatile memory such as, for example, a flash memory device. In an exemplary embodiment, the local controller 102a may be operably coupled to the host controller 104 by a hard wired and/or wireless communication pathway. In an exemplary embodiment, during the operation of the laminate compaction device 102, the local controller 102a monitors and controls the operation of the laminate compaction device 102 and permits the host controller 104 to monitor and control the operation of the laminate compaction device.

In an exemplary embodiment, the compaction device position sensor 102b may be operably coupled to the local controller 102a and one or more conventional location sensing devices such as, for example, a global positioning system, a radio frequency triangulation positioning system, an optical positioning system and/or a laser positioning system. In an exemplary embodiment, during the operation of the laminate compaction device, 102, the compaction device position sensor 102b permits the local controller 102a to monitor and control the position the of the laminate compaction device. As a result, the position of the laminate compaction device 102 within a mold may be monitored and controlled.

In an exemplary embodiment, the laminate sensor 102c may be operably coupled to the local controller 102a and may provide one or more signals that are representative of the degree to which a laminate layer has been compacted by the laminate compaction device 102. In an exemplary embodiment, the laminate sensor 102c may include any sensor capable of generating a signal that is representative of the degree to which a laminate layer has been compacted by the laminate compaction device 102 such as, for example, an ultrasonic sensor.

In an exemplary embodiment, the compaction device actuator 102d may be operably coupled to the local controller 102a and, under the monitoring and control of the local controller, may be operated to position the laminate compaction device 102. In this manner, the compaction device actuator 102d may be operated to position the laminate compaction device 102 relative to a mold containing one or more layers of a laminate. In an exemplary embodiment, the compaction device actuator 102d may be a conventional actuator such as, for example, a pneumatic, an hydraulic and/or an electric powered actuator.

In an exemplary embodiment, the vibrator 102e may be operably coupled to the local controller 102a and, under the monitoring and control of the local controller, may be operated to inject vibratory energy into the laminate layers within a mold to thereby enhance the compaction of the laminate layers by the rollers 102h. In an exemplary embodiment, the vibrator 102e may be a conventional vibrator such as, for example, a pneumatic, an hydraulic and/or an electric powered vibrator.

In an exemplary embodiment, the roller motor 102f may be operably coupled to the local controller 102a and the rollers 102h. In an exemplary embodiment, the roller motor 102f, under the monitoring and control of the local controller 102a, may be operated to rotate the rollers 102h into contact with layers of laminate in order to compact the layers of laminate. In an exemplary embodiment, the roller motor 102*f* may be a conventional motor such as, for example, a pneumatic, an hydraulic and/or an electric powered motor.

In an exemplary embodiment, the heater 102*g* may be operably coupled to the local controller 102*a* and, under the monitoring and control of the local controller, may be operated to inject thermal energy into the laminate layers within a mold to thereby enhance the compaction of the laminate layers by the rollers 102*h* by softening the laminate layers. In an exemplary embodiment, the heater 102*g* may include one or more heating devices which may be incorporated into one or more of the rollers 102*h*. In an exemplary embodiment, the heater 102*g* may be a conventional heating device such as, for example, a radiant, ultra-violet, electron beam, and/or hot air heat source that may include a feedback control system to monitor and control the operating temperature and/or the thermal output of the heater 102*g*.

In an exemplary embodiment, as illustrated in FIGS. 2*a* and 2*b*, the rollers 102*h* are operably coupled to a support member 102*fa* coupled to an end of an output shaft 102*fb* of the motor 102*f* such that the rollers rotate about an axis of rotation defined by the output shaft of the motor within a substantially common plane. In this manner, in an exemplary embodiment, all of the rollers 102*h* maintain at least some contact pressure with a laminate layer during the compaction process as they rotate about the common axis of rotation. In an exemplary embodiment, one or more of the rollers 102*h* may be balls and/or rollers that may, for example, be compressible and/or compliant. In an exemplary embodiment, one or more of rollers 102*h* may be compliantly mounted onto the output shaft of the motor 102*f* using, for example, a shock absorber, in order minimize shock loading to the layers of laminate material.

In an exemplary embodiment, the rollers 102*h* may include a centrally positioned, whose center of contact with the laminate layers is coincident with the axis of the rotation of the output shaft 102*fb* of the motor 102*f*. In this manner, the operation of the laminate compaction devices 102 to compact laminate layers may be stabilized.

In an exemplary embodiment, roller pressure sensor 102*i* may be operably coupled to the local controller 102*a* and, under the monitoring and control of the local controller, may be operated to monitor the level of contact pressure between one or more of the rollers 102*h* and the laminate layers. In an exemplary embodiment, the roller pressure sensor 102*i* may be incorporated into one or more of the rollers 102*h*.

Referring now to FIGS. 3*a*, 3*b*, 3*c*, 4 and 5, in an exemplary embodiment, a method 300 of manufacturing a composite structure may be implemented by the system 100 in which, in 302, laminate layers 402 are positioned within a mold 404. In an exemplary embodiment, the laminate layers 402 are conventional laminate layers used in the manufacture of composite structures. In an exemplary embodiment, in 302, a polymer release ply, or other equivalent release layer, may be also be applied to the top surfaces of the laminate layers 402 in order to avoid direct contact between the rollers 102*h* of the laminate compaction devices 102 and the laminate layers.

In an exemplary embodiment, in 304, the system 100 then operates one or more of the laminate compaction devices 102 to compact a region of the laminate layers 402. In an exemplary embodiment, in 304, the uncompacted regions of the laminate layers 402 are vertically suspended until compacted by operation of the laminate compaction device 102. In an exemplary embodiment, in 304, the laminate compaction devices 102 compact the laminate layers 402 by rotating the rollers 102*h* while maintaining contact with the laminate layers. In an exemplary embodiment, in 304, one or more of the rollers 102*h* may inject thermal energy into the laminate layers 402 by operation of the heater 102*g*. In this manner, the compaction of the laminate layers 402 may be enhanced. Furthermore, in an exemplary embodiment, in 304, the vibrator 102*e* of one or more of the laminate compaction devices 102 may be operated to inject vibrational energy into the laminate layers 402 to enhance the compaction of the laminate layers 402.

In an exemplary embodiment, in 304, the system 100 initially operates the laminate compaction devices 102 to compact laminate layers 402 within a central zone of the mold 404. In this manner, any subsequent compactions of laminate layers 402 within other peripheral regions of the mold is enhanced. Furthermore, in an exemplary embodiment, in 304, the laminate compaction devices 102 may be operated to rotate the plane of rotation of the rollers 102*h* to increase/modify the level of contact pressure and compaction of the laminate layers 402. In an exemplary embodiment, the rotation of the plane of rotation of the rollers 102*h* to increase/modify the level of contact pressure and compaction of the laminate layers 402, in 304, may be provided may either manual operation or by providing additional actuators and feedback control by the local controller 102*a*.

In an exemplary embodiment, in 306, the system 100 monitors the compaction of the laminate layers 402 by the one or more laminate compaction devices 102 and, if the system determines in 308 that the laminate layers are not completely compacted, then the system continues the compaction of the laminate layers in 304, 306 and 308. In an exemplary embodiment, in 306, the systems 100 monitors the compaction of the laminate layers 402 by the one or more laminate compaction devices 102 by monitoring the output signals of the laminate sensors 102*c* of the one or more laminate compaction devices 102 to determine the degree to which the laminate layers 402 have been compacted.

Alternatively, if in 308, the system 100 determines that the laminate layers 402 have been completely compacted, then the system, in 310, determines if there are any remaining regions of the laminate layers 402 that still need to be compacted. If the system 100 determines, in 310, that there are remaining regions of the laminate layers 402 that still need to be compacted, then the system operates one or more of the laminate compaction devices 102, in 312, to re-position one or more of the laminate compaction devices to the remaining regions of the laminate layers 402 that still need to be compacted. In an exemplary embodiment, in 312, the system 100 operates one or more of the laminate compaction device 102, in 312, to re-position one or more of the laminate compaction devices to the remaining regions of the laminate layers 402 that still need to be compacted by monitoring and controlling the operation of the compaction device actuators 102*d* of the laminate compaction devices to thereby re-position one or more of the laminate compaction devices to the remaining regions of the laminate layers 402 that still need to be compacted. The system 100 then continues with the compaction of the remaining regions of the laminate layers 402 that still need to be compacted using the method 300 in 304, 306 and 308 as described above.

Alternatively, if the system 100 determines, in 310, that there are no remaining regions of the laminate layers 402 that still need to be compacted, then the system determines if there are any more laminate layers 402 that still need to be positioned within the mold 404 in 314.

If the system 100 determines, in 314, that there are more laminate layers 402 that still need to be positioned within the mold 404, then the system continues the method 300 in 302, 304, 306 and 308 as described above. In an exemplary embodiment, if the system 100 determines, in 314, that there are more laminate layers 402 that still need to be positioned within the mold 404, then a separator film may be positioned onto the top layer of laminate film 402 in the mold 404 before the system continues the method 300 in 302. In this manner, the placement of the additional laminate layers in 302 into the mold 404 such that the internal contours of the mold are to be followed by the additional laminate layers may be facilitated.

Figure 6:
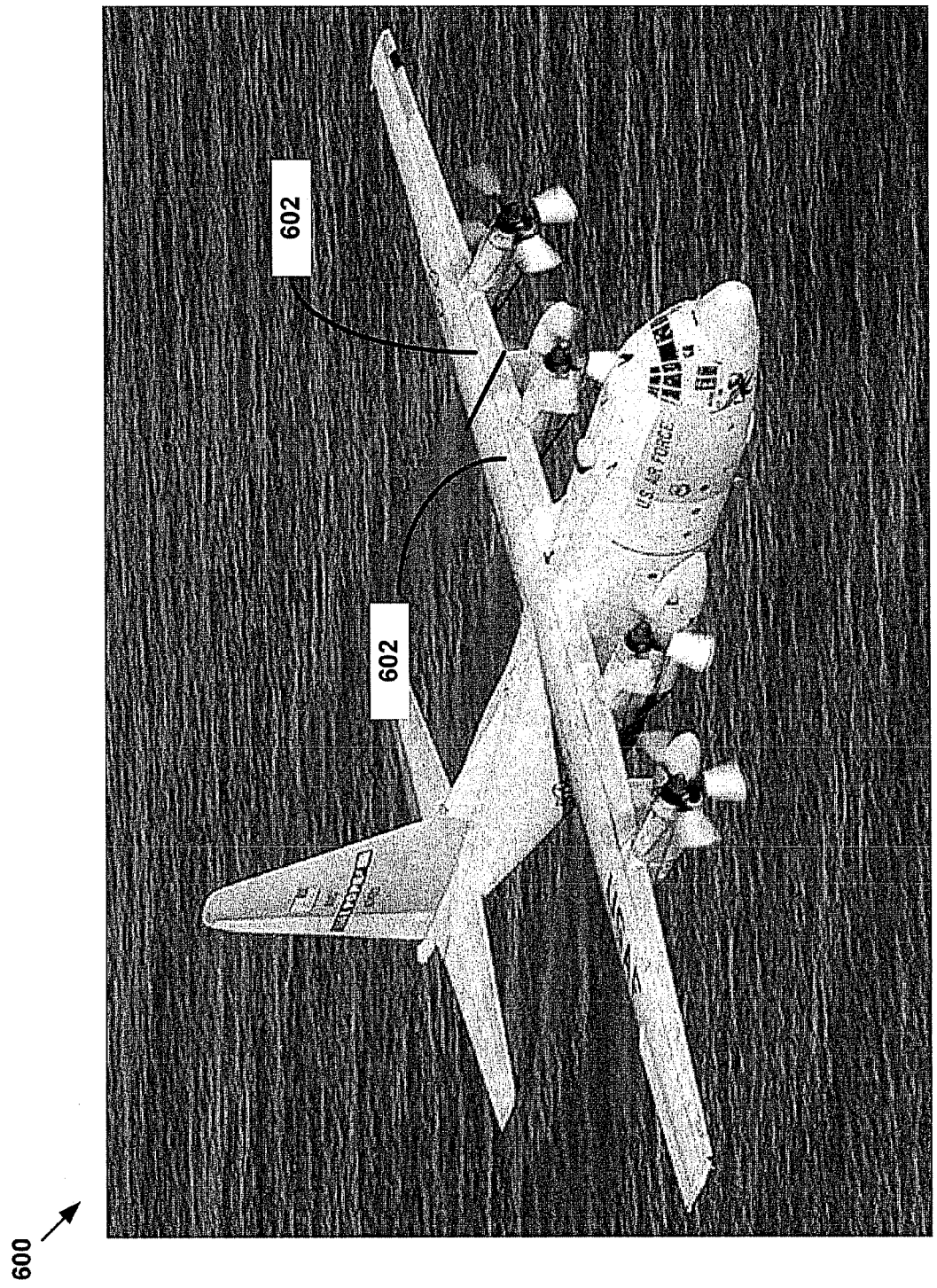
FIG. 6 is an illustration of the manufacture of an aircraft using one or more composite surface panels.

Alternatively, if the system 100 determines, in 314, that there are no more laminate layers 402 that still need to be positioned within the mold 404, then the system cures the laminate layers 402 within the mold 404, in 316, in a conventional manner to produce a composite structure such as, for example, as illustrated in FIG. 6, for use as surface panels 602 in an aircraft 600. In an exemplary embodiment, as will be recognized by persons having ordinary skill in the art, prior to curing the laminate layers 402 within the mold 404 in 316, conventional processing steps such, for example, normal lay-up procedures including bagging, oven or autoclave compaction or cures, may be performed.

It is understood that variations may be made in the above without departing from the scope of the invention. For example, while the exemplary embodiments are directed to the manufacture of an aircraft, the teachings of the present disclosure may be applied to the manufacture of any structure. In addition, one or more of balls and or conveyers belts may be used in combination with, or instead of, one or more of the rollers 102h of the laminate compaction device 102 for use in compacting the laminate layers 402. Furthermore, the method 300 may also include the placement of other structures within and/or between the laminate layers 402 such as, for example, honeycomb structures, non-laminate materials, and/or pre-cured structural members. In addition, spatial references are for the purpose of illustration only and do not limit the specific orientation or location of the structure described above. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. An apparatus for compacting laminate material onto a mold, comprising:
    a support member;
    a motor having a drive shaft operably coupled to the support member to rotate the support member about an axis of the drive shaft;
    a plurality of rollers in engagement with the support member and spaced in an array around the axis of the drive shaft so that rotation of the support member causes the rollers to rotate about the axis of the drive shaft relative to the support member to compact the laminate material onto the mold;
    a controller operably coupled to the motor for monitoring and controlling the operation of the motor;
    a sensor unit for monitoring the compaction of the laminate material and causing the rollers to compact the laminate a material until the compacting is complete; and
    at least one heater, the heater being housed in one of the rollers for injecting thermal energy into the laminate material on the mold as said one of the rollers rolls over the laminate material, wherein the rollers comprise balls.

2. The apparatus of claim 1, wherein the sensor unit comprises one or more ultrasonic sensors operably coupled to the controller for generating one or more signals representative of a degree to which the laminate material has been compacted.

3. The apparatus of claim 1, further comprising one or more sources of vibration operably coupled to the controller for injecting vibrational energy from the rollers into the laminate material.

4. The apparatus of claim 3, wherein one or more of the sources of vibration are housed within the rollers.

5. The apparatus of claim 1, further comprising one or more pressure sensors operably coupled to the controller and to at least one of the rollers for sensing a degree of contact pressure between said at least one of the rollers and the mold.

6. The apparatus of claim 1, further comprising one or more temperature sensors operably coupled to the controller for generating signals representative of an operating temperature of said at least one heater.

7. The apparatus of claim 1, further comprising one or more actuators operably coupled to the controller for positioning the apparatus on various regions of the mold.

8. The apparatus of claim 1, further comprising one or more location sensors operably coupled to the controller for generating signals representative of a changing location of the apparatus as the apparatus moves into different regions of the mold.

9. An apparatus for compacting laminate material onto a mold, comprising:
    a support member having an upper side and a lower side;
    a motor having a drive shaft operably coupled to and extending upward from the upper side of the support member to rotate the support member about an axis of rotation;
    a plurality of laminate compaction rollers mounted to the lower side of the support member and spaced in an array around the axis of rotation so that rotation of the support member causes the rollers to rotate in a circular path about the axis of rotation to compact the laminate material;
    the support member being movable to various regions of the mold and having a location sensor operably coupled to the support member that provides a signal to the controller representative of the location of the support member within the various regions of the mold; and
    a laminate ultrasonic sensor operably coupled to the support member that provides signals to the controller of the degree to which the laminate material has been compacted on the mold, wherein the rollers comprise balls.

10. The apparatus of claim 9, wherein the laminate sensor comprises an ultrasonic sensor.

11. The apparatus of claim 9, wherein the plurality of rollers comprises at least three rollers.

12. The apparatus of claim 9, wherein each of the rollers is spaced a same radial distance from the axis of rotation.

13. An apparatus for compacting laminate material, comprising:
    a mold for receiving layers of laminate material;
    a support member positioned adjacent the mold;
    a motor having a drive shaft operably coupled to the support member to rotate the support member about an axis of rotation of the support member;

a plurality of balls of compliant material mounted to the support member and spaced in an array around the axis of rotation so that rotation of the support member causes each of the balls to rotate in a circular path concentric with the axis of rotation to compact each layer of the laminate material onto the die;

an actuator coupled to the support member that transversely moves the support member, the motor, and the rollers relative to the axis of rotation to various regions of the mold;

at least one heater, the heater being housed in one of the rollers for injecting thermal energy into the laminate material on the mold as said one of the rollers rolls over the laminate material;

a location sensor operably coupled to the support member that provides a signal to the controller representative of the location of the support member within the various regions of the mold;

a pressure sensor operably coupled to the support member that monitors a level of contact pressure applied by the rollers to the mold; and a laminate ultrasonic sensor operably coupled to the support member that provides signals to the controller of the degree to which the laminate material has been compacted on the mold.

* * * * *